United States Patent [19]

Sims

[11] Patent Number: 4,735,717
[45] Date of Patent: Apr. 5, 1988

[54] SPIRAL WOUND PRESSURE MEMBRANE MODULE

[75] Inventor: Keith J. Sims, Framingham, Mass.
[73] Assignee: Ionics Incorporated, Watertown, Mass.
[21] Appl. No.: 50,988
[22] Filed: May 18, 1987
[51] Int. Cl.⁴ .............................................. B01D 13/00
[52] U.S. Cl. ................................... 210/247; 210/317; 210/494.1
[58] Field of Search ..................... 210/247, 317, 321.1, 210/321.2, 321.3, 494.1, 497.1

[56] References Cited

U.S. PATENT DOCUMENTS 3,542,199 11/1970 Bray et al. .................... 210/317 X
4,235,722 11/1980 Sakaguchi .......................... 210/247

Primary Examiner—Frank Spear
Attorney, Agent, or Firm—Norman E. Saliba

[57] ABSTRACT

An improved spiral-wound pressure membrane sorbent bed module is disclosed comprising a central permeate conduit around which said spiral is wound, said module also comprising a collection means for each membrane envelope in said module, said collection means communicating with the interior of said envelope along a substantial fraction of one edge of a permeate spacer in said envelope, all said collection means conveying permeate to the interior of said central permeate conduit at substantially the same cross-section of said conduit, the interior of said conduit containing sorbing means.

10 Claims, 3 Drawing Sheets

SPIRAL WOUND PRESSURE MEMBRANE MODULE

BACKGROUND OF THE INVENTION

1. Field of the Invention

This invention pertains to improved spiral-wound pressure membrane modules comprising a central permeate conduit around which is wrapped in swiss-roll fashion one or more membrane envelopes as disclosed for example in U.S. Pat. Nos. 3,367,504 and 3,417,870. Each envelope comprises a pair of generally asymmetric or thin film membranes separated from each other by a permeate spacer adapted to afford mechanical support to the membranes and to carry fluid permeating through the membranes along the spiral to the central permeate conduit. The membranes in the pair are typically sealed to each other along three edges with an adhesive or by heat or solvent welding. The remaining edge of the pair may remain open to permit permeate to flow into the central permeate conduit. The latter is generally circular in cross-section, the better to withstand the pressure applied to the module. The wraps in the spiral are typically separated from each other by so-called feed side spacers adapted to support the membranes and facilitate mass-transport to the membrane surfaces. Such spiral wound modules were apparently first used for the production of potable water from brackish water but now are also commonly used for ultrafiltration, microfiltration, gas-separations and other processes. Generally these pressure-driven membrane separation processes do not provide perfect separation of the components in the fluid processed and the permeate may need to be reprocessed by one or more additional stages of the same (or other) pressure-driven membrane processor by one or more auxiliary processes. For example in the case of demineralization of saline water, the permeate may contain from about one to about twenty percent or more of the mineral concentration present in the feed saline water and in addition low molecular weight organics (such as trihalomethanes), microorganisms, viruses, endotoxins and pyrogens. The permeate may also contain concentrations of heavy metal ions such as lead, cadmium, mercury, chromate, radiostrontium and the like which render the permeate as is unsuitable for the intended use, e.g. for safe drinking water, pharmaceutics, rinsing of large scale integrated circuits, etc. It may be necessary to pass the permeate through additional process apparatus, for example, activated carbon and/or a mixed bed ion-exchange resin bed to remove residual organics. Such auxiliary apparatus obviously adds cost and complexity to the otherwise elegant piezo-membrane process. Activated carbon and ion-exchange resins are examples respectively of adsorption and adsorption materials typically used in fluid processing. Herein these and like materials are referred to generally as sorbing means or sorbents. Such sorbents are most efficiently used in countercurrent processes, the fluid to be processed contacting first that portion of the sorbing means having the highest loading of sorbate and finally that portion having the lowest loading. Such contacting is best carried out in columns or beds in which the fluid processed enters at one end and exits at the other.

According to the instant invention, such column replaces the conventional permeate conduit of pressure driven spiral wound modules known in the prior art, collection means in the integrated module conveying the membrane permeate to substantially the same cross-section of the sorbent column thereby providing the efficiency of counter-current contacting with the simplicity of a single integrated module. 2. Description of the Prior Art Spiral wound pressure membrane modules for reverse osmosis desalination of brackish water are disclosed in U.S. Pat. Nos. 3,367,504 and 3,417,870 among others. Similar construction are used for example in ultrafiltration, microfiltration and membrane gas-separations. The membrane envelopes containing permeate separators and inter-leaved with feed spacers are wrapped around a central core typically perforated along lines which communicate with the interior of each envelope. The permeate therefore flows more or less uniformly into the core along the entire length in contact with the envelope. Hence the core is not really suitable as a container for an auxiliary sorbent and as a consequence trains of separation processes are coupled together in separate containers. For example in the case of home water systems designed to make safe drinking water, typically a low pressure reverse osmosis module designed to remove 80 to 90 percent of dissolved minerals and organic compounds is followed by an activated carbon filter to remove additional organics. In the case of point-of-use rinse water systems for electronic components an ultrafiltration module may be followed by a mixed bed ion-exchanger.

DESCRIPTION OF PREFERRED EMBODIMENTS

In its broadest aspect, the present invention comprises generally a spiral-wound, pressure membrane module comprising a central permeate conduit around which said spiral is wound, said module also comprising a collection means for each membrane envelope (or leaf or sandwich) in said module, said collection means communicating with the interior of said leaf along a substantial fraction of one edge of a permeate spacer in said leaf, all said collection means in said module conveying permeate to the interior of said central permeate conduit at substantially the same cross-section of said conduit, the interior of said conduit containing sorbing means.

Figure 1A:
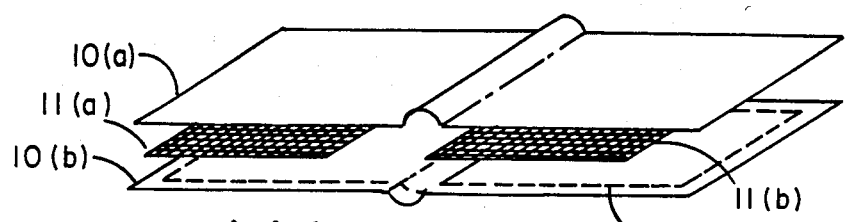
FIG. 1 is a schematic representation of a pressure membrane element suitable for spiral winding known in the prior art.
Figure 1B:
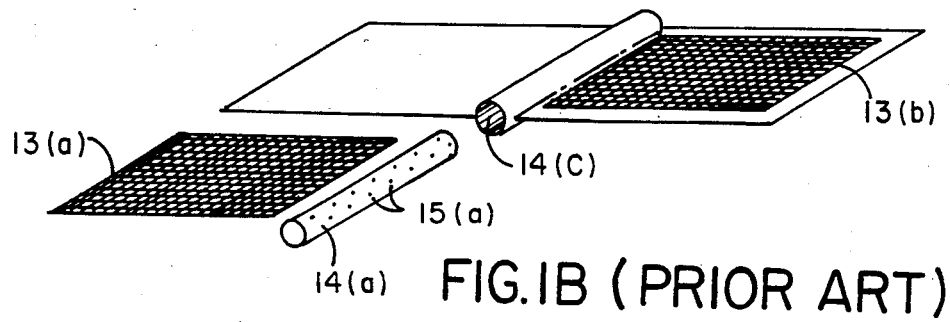

Referring to FIG. 1, there is indicated a schematic representation in unwound state of a sprial wound pressure membrane module known in the prior art. In part (a) of said Figure there are indicated two generally asymmetric membranes 10(a) and 10(b) separated by permeate spacers 11(a) and 11(b). Also indicated is glue or weld line 12 along which membranes 10(a) and 10(b) will be joined to form a two-leaved membrane element as shown in part (b) of the FIG. 1. (Generally a spiral wound pressure membrane module will have from one to six leaves). Here 14(a) represents a conventional permeate conduit for collecting permeate from permeate spacers 11(a) and 11(b). 15(a) represents holes which allow permeate to enter the permeate conduit from the permeate spacers. Conduit 14(a) will be sealed into a matching opening 14(c) in the membrane element.

If the membranes are of the "thin film" variety, that is consisting of a thin skin in which most of the selective permeability and fluid resistance reside and a thicker, more porous support layer, then generally the support layer will be in contact with the permeate spacers 11(a) and 11(b). The thin skins will be separated in the rolled up configuration by feed spacers 13(a) and 13(b), the latter generally also promoting mass transfer to the membrane surfaces.

In the case of pressure membrane modules intended for desalination of sea, brackish or potable water, that is by the process known as reverse osmosis, hyperfiltration or piezo-osmosis, the membranes may for example be asymmetric comprising usually one of the following polymers: fully aromatic polyamides (for example those made by E. I. du Pont de Nemours & Co., Inc., Wilmington, Del., U.S.A.; Film Tec Corp., Minneapolis, Minn. U.S.A. or De Danske Lukkerfabrikke, Nakskov, Denmark); acrylalkyl polyamides/polyureas (for example those made by Fluid Systems, San Diego, Calif. U.S.A., Hydranautics, Goleta, Calif. U.S.A., Toray Industries, Inc., Tokyo, Japan or Nitto Electrical Industrial Co., Ltd., Osaka, Japan); cellulose acetate (for example those made by De Danske Lukkerfabrikker, Hydranautics,-Fluid Systems, Desalination Systems, Inc., Escondido, Calif. U.S.A., Envirogenics Systems Co., El Monte, Calif. U.S.A., Osmonics, Inc., Minnetonka, Minn. U.S.A.); polyacrylonitrile (for example made by Sumitomo Chemical Co., Tokyo, Japan); polybenzimidazolone (for example made by Teijin Ltd., Tokyo, Japan); polypiperazineamides) for example made by Film Tec, Nitto Electrical and Toray); sulfonated polyfuran (for example made by Toray); sulfonated polysulfone (for example made by Desalination Systems and Millipore Corp., Bedford, Mass. U.S.A.). For low pressure systems, e.g. for safe drinking water systems for home use, cellulose acetate, sulfonated polysulfone, polypiperozincamides and fully aromatic polyamides are particularly satisfactory.

In the case of modules intended for ultrafiltration the membranes may, for example, be asymmetric comprising one of the following materials: cellulose acetate; polycarbonate; polyvinyl chloride; polyamides; polysulfone; sulfonated polyfulfone; polyvinylidene fluoride; copolymers of acrylonitrile and vinyl chloride; polyacetal; polyacrylates; polyelectrolyte coacervates; and cross-linked polyvinyl alcohol.

In the case of modules intended for microfiltration the membranes may, for example, be asymmetric or of the thin film type and comprise one of the following materials. cellulose nitrate; cellulose nitratecellulose acetate; cellulose acetate; acrylic copolymers; polyvinyl chloride; polyvinylidene fluoride; polyamide; polytetrafluoroethylene; polysulfone; sulfonated polysulfone; polycarbonate; polyethers; polypropylene.

In the case of modules intended for membrane gas separations by the solution-diffusion mechanism, the membranes may, for example, be asymmetric or of the thin film type and comprise one of the following materials: cellulose acetate (see for example Ind. Eng. Chem. Prod. Res. Dev. 8 (1969) page 84 et seq. or Chem. Eng. 7 June 76, page 1 et seq); silicone-polycarbonate copolymers; polyphenylene oxide; polyethylene or silicone rubber coated polysufone; polyester; polyacrylonitrile; polyamide; and the like.

The membranes may be reinforced, for example with hot calendered, polyester fabric woven from multifilament yarn or with spunbonded non-woven polyester fabric.

The permeate spacers may be, for example, knitted polyester tricot fabric treated with melamine or epoxy resin. The fabric is generally oriented so the machine direction (direction of the longitudinal wales) is parallel to the direction of desired permeate flow.

The feed spacers may be, for example, a diagonally cross-laid, nonwoven extruded polypropylene net, typically about 0.75 mm thick.

It will be seen according to FIG. 1, that in the prior art, permeate enters the permeate conduit substantially uniformly along the entire interface between the permeate conduit and any given leaf. Hence if sorbent is placed in the interior of the permeate conduit, contact between the permeate and the sorbent will not be counter-current, the sorbent will not be efficiently utilized and the permeate will not be effectively purified.

Figure 2A:
FIG. 2 is a schematic representation of two preferred core permeate conduits according to the present invention.
Figure 2B:
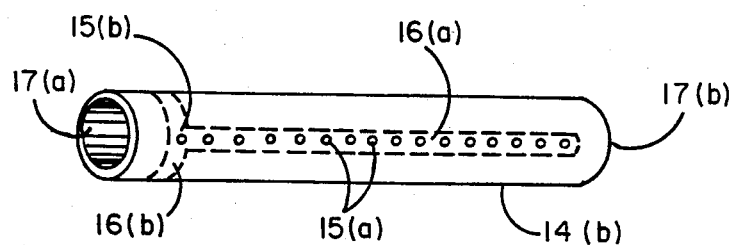

Referring to FIG. 2 there are illustrated two preferred permeate conduits in accordance with the present invention. In part (a) there is indicated a permeate conduit or tube 14(b) having a groove or channel 16(a) extending along a substantial length of tube 14(b) and adapted to be juxtaposed along a substantial fraction of the permeate spacer in a membrane leaf. The groove terminates in a second, circumferential groove 16(b) containing holes communicating generally with only one end of conduit 14(b). It will be understood that channel 16(b) must be sealed by the membranes or other means to prevent entry by fluid which has not permeated the membranes. Hence if end 17(a) of conduit 14(b) is closed for example with a plug or by contact with a container holding the module then permeate will issue only from end 17(b) and the conduit will be an effective contactor for sorbent and permeate. It will be understood that channel 16(a) may be in fact two or more parallel, shallow grooves the exact configuration depending upon the strength of the membranes in the leaf, the pressure utilized and the permeate flow in the leaf. Although only one groove 16(a) is shown in part (a) of FIG. 2, there will in general be one such groove (or group of parallel grooves) for each leaf in the spiral. Further, depending upon (for example) the permeate flow rate there may be only a single hole 15(b) near the end of channel 16(a) communicating with the interior of conduit 14(b). In such case circumferential groove 16(b) may not be required. In general however circumferential groove 16(b) and holes 15(b) will communicate with all the grooves 16(b), one for each leaf in the spiral.

Part (b) of FIG. 2 illustrates diagrammatically a second preferred permeate conduit according to this invention, the channel(s) 16(a) having a fixed or removable cover containing holes 15(b) communicating with channel 16(a) and with the permeate spacer in the membrane leaf. Channel 16(b) may be similarly covered, such cover in this case generally being without holes. The covers on channels 16(a) and/or 16(b) provide additional mechanical support for the membrane spiral. Channel 16(a) may be conveniently prepared by drilling a hole from one or both ends of conduit 14(b) within the wall of said conduit, drilling holes 15(a) and 15(b) and inserting plugs in the ends of conduit 16(a).

It will be understood that the interior dimensions (i.e. the inside diameter and length of the sorbent bed) of conduit 14(b) should be adapted to match the required total bed capacity and contact time as determined by total permeate flux; the quantity of sorbate to be removed; the rate of sorption; the total capacity per unit volume of sorbent; and the time desired between regenerations or replacements of the sorbent or replacements of the integrated sorbent/pressure membrane module. Thus for example: if the membrane permeate is 5 U.S. gallons of water per day, it is desired to remove about 0.1 grains of dissolved organics per gallon of permeate, (suitable activated carbon has a sorption capacity of about 65,000 grains of dissolved organics per cubic foot) and it is desired to replace the activated carbon only once per year, then the inside available volume of conduit 14(b) should be suitable to contain about 5 cubic inches of activated carbon. However if a 20 minute contact time is required because of kenetic limitations, then about 16 cubic inches of carbon is required.

It will be further understood that the direction of flow on the reject side of the membrane and in the sorbate bed must be upflow to minimize chances of maldistribution or channeling due to gas accummulation. Such maldistribution or channeling could result in inefficient use of membrane or sorbate.

Suitable sorbents obviously depend on the contaminants to be removed. for example although a cellulose acetate reverse osmosis membrane in low pressure use may remove 80 percent or so of dissolved divalent, mineral cations, such percentage removal may not be sufficient for lead, cadmium and mercury. In such case the sorbent may be a chelating cation exchange resin in the calcium, magnesium or sodium form, for example Lewatit ® OC-1048 (Bayer A.G., Leverkusen B.R.D.), Duolite ® ES 467 (Rohm and Haas Co., Philadelphia, Pa, U.S.A.), Diaion ® CR-10 (Mitsubishi Chemical Industries, Ltd., Tokyo, Japan), Amberlite ® IRC-718 (Rohm and Haas Co.). Further such membrane may remove an insufficient fraction of trihalomethanes and other undesired dissolved organics (and will in fact concentrate some organics such as phenol and formaldehyde). In such case the sorbent may be an activated carbon. A mixture of individual layers (beds) of activated carbon and chelating cation exchange resin may be used to remove both noxious-heavy metal ions and dissolved organics. anion exchange resin in the chloride form may be used as sorbent to remove trace quantities of chromate not sufficiently removed by the reverse osmosis membrane(s). It is well known that most commercial reverse osmosis membranes do not completely remove microorganisms and viruses. It is also well known that microorganisms can grow back through a contaminated product storage and delivery system. Such systems are difficult to disinfect entirely when originally installed and also usually are subject to growback through demand valves open to the atmosphere. In such case the sorbent contained in a permeate conduit in accordance with this example may comprise a silvered activated carbon, for example Hygene ® (Ionics, Inc., Bridgeville, Pa., U.S.A.) containing about 1.05 percent silver. Silver will be leached from said carbon at a rate not exceeding 0.05 ppm and the oligodynamic properties of such dissolved silver will inhibit the growth of many microorganisms downstream of the integrated RO/sorbent module. On the other hand, highly porous quaternary ammonium anion exchangers (e.g. having an average pore size in excess of 5 microns) have a high capacity for coliform bacteria (e.g. the gram negative E. coli), fecal bacteria (e.g. the Gram positive S. faecalis), pathogenic bacteria (e.g. the Gram negative Pseudomonas aeruginosa, viruses, pyrogens and endotoxins. An example is Ambergard XE 352 (Rohm and Haas Co., Philadelphia, Pa., U.S.A.). Such resins, particularly when in the hydroxide form and mixed with about 0.25 parts of a strongly acid cation exchanger in the acid form, is a particularly useful sorbent in integrated RO/sorbent, UF/sorbent and/or MF/sorbent modules manufactured according to this invention for point-of-use water systems in the pharmaceutical and electronics industries.

As yet another illustration, spiral wound gas-separation modules are indicated for portable or sick-room use for patients requiring oxygenenriched air (25 to 40 percent oxygen). It is desirable to integrate activated carbon into the module to remove organics and carbon monoxide which may have penetrated the gas-separation membrane. Other sorbents useful in gas-separation pressure membrane modules include activated silica, activated alumina, molecular sieves (i.e. activated aluminosilicates).

Conveniently the sorbent may be contained in a sac or stocking, porous at least in the region in which membrane permeate will be introduced and in the region from which treated fluid will exit said sorbent. Such sac (particularly if a string is attached) permits ready replacement of the sorbent when it is exhausted. The sorbent may often be regenerated in situ. For example the highly porous quaternary ammonium anion exchangers for sorbing micro-organisms may be regenerated in place with dilute hydrochloric acid; chelating cation exchangers may be regenerated first with dilute hydrochloric acid and then with dilute alkali; activated carbon in gas-separation use may often be regenerated by applying a vacuum, i.e. pressure swing regeneration.

On the other hand the spiral wound pressure membrane element/sorbent module may be replaced as a unit. This will particularly be the case when, for example, the membrane/sorbent integrated module is used dead-ended (i.e. when all the feed passes through the membrane). Such applications include point-of-use final polishing of water for pharmaceutical and electronics uses or final polishing of medical gases. In these cases, whenever possible, the volume of sorbent(s) and area of membrane should be balanced so each element reaches the end of its useful life at about the same time. It will be understood that even in cases in which the membrane elements are operated in cross-flow (i.e. not deadended) it may be possible to balance the volume of sorbent(s) and the area of membrane so both can be replaced or rejuvinated at the same time.

Referring to FIG. 3 there are illustrated schematically two methods of feeding fluid to be processed to spiral wound pressure membrane modules. In part (a) of FIG. 3 feed enters the feed spacers between the membrane envelopes (leaves, sandwiches) at the distal end of the windings along the opening 18, flowing inwardly along the spiral feed spacers and exiting the module for example through holes 21(a). In this case the end 19(a) of the spiral will typically be completely sealed. Mixing of feed fluid and effluent retentate (non-permeate) may be prevented by sealing means 20(a). Permeate may exit through end 17(b) of the permeate conduit in which case according to the present invention such permeate should enter the conduit near end 19(a) of the module. If the spiral wound module consists of more than one leaf then there will in general be one entrance slit 18 for each leaf.

In part (b) of FIG. 3 there is illustrated a module in which feed fluid enters the feed spacers at end 19(b) and exits at ends 21(b). Mixing of feed fluid and effluent retentate may be prevented by sealing means 20(b). Permeate may exit through end 17(b) of the permeate conduit in which case according to the present invention such permeate should enter the conduit near end 19(b) of the module.

The choice of feed method depends typically on the width of each membrane envelope (measured in the direction of the axis of the permeate conduit) compared to its length (measured in the direction of wrapping). Generally for a given ratio of feed to permeate flow one wishes to have the highest possible scrubbing velocity in the feed spacers in order to decrease concentration polarization at the membrane surfaces. Generally also the orientation of the feed spacer material will depend on whether distal edge or end feed is used.

Figure 4:
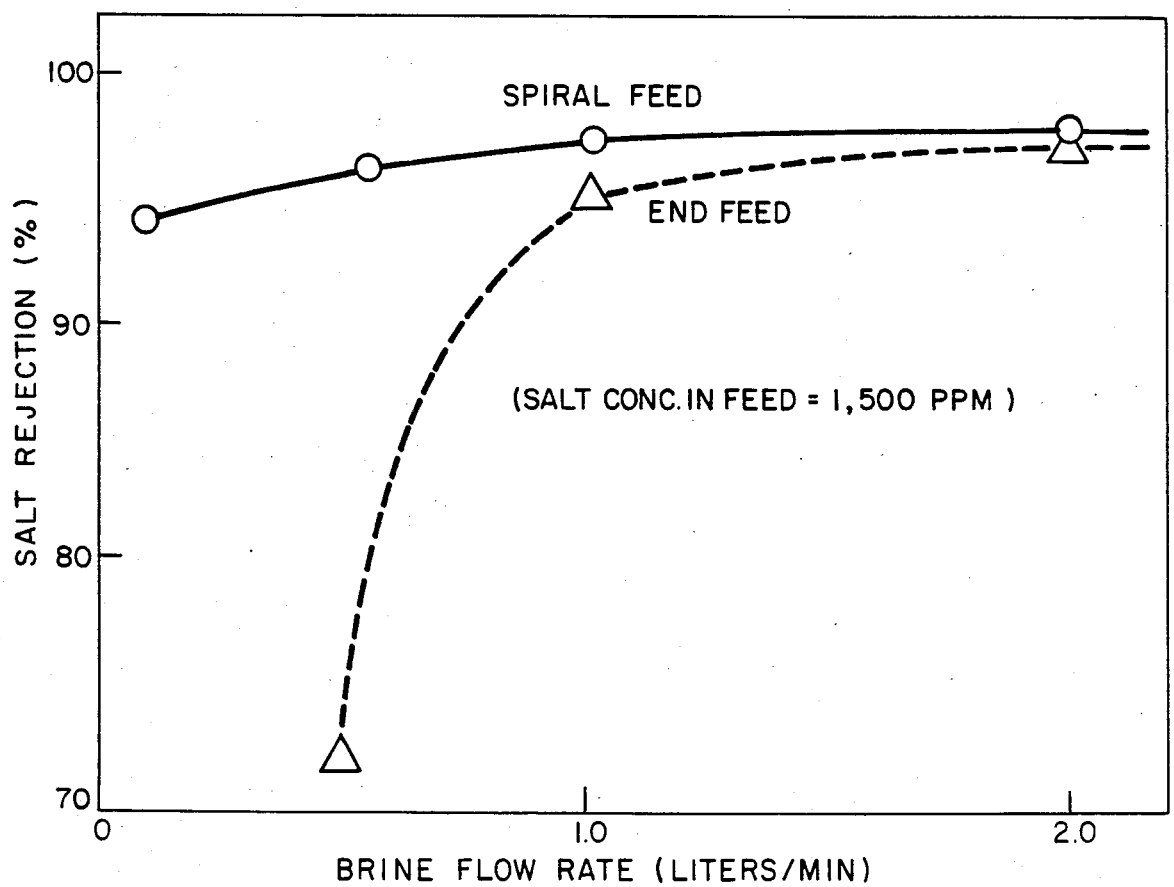
FIG. 4 is a diagram comparing the approximate performance of spiral fed and end fed spiral wound pressure membrane modules.

FIG. 4 illustrates the advantage of spiral (distal edge) feed to end feed in the case in which the length of each envelope is substantially greater than its width. At low brine (non-permeate, retentate) flow rates the scrubbing velocity with end feed is not sufficient substantially to reduce concentration polarization.

Figure 5A:
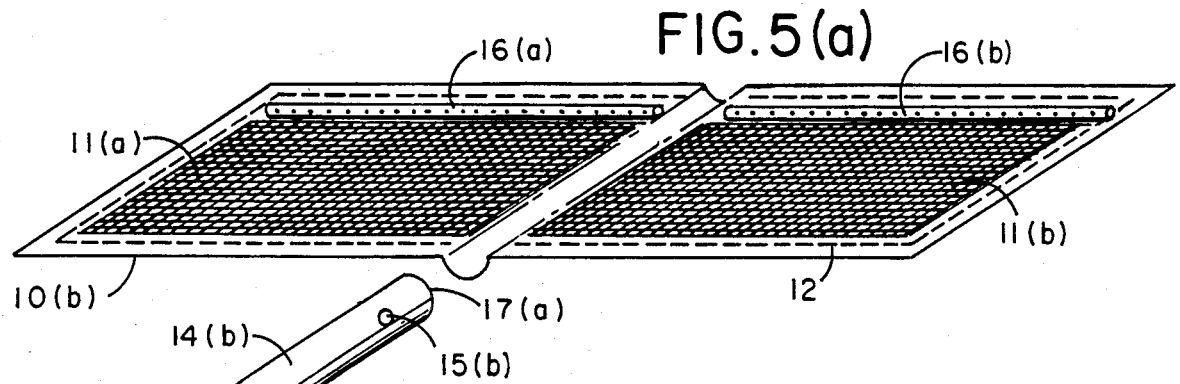
FIG. 5 is a schematic representation of 3 additional preferred spiral wound modules according to the present invention.
Figure 5B:
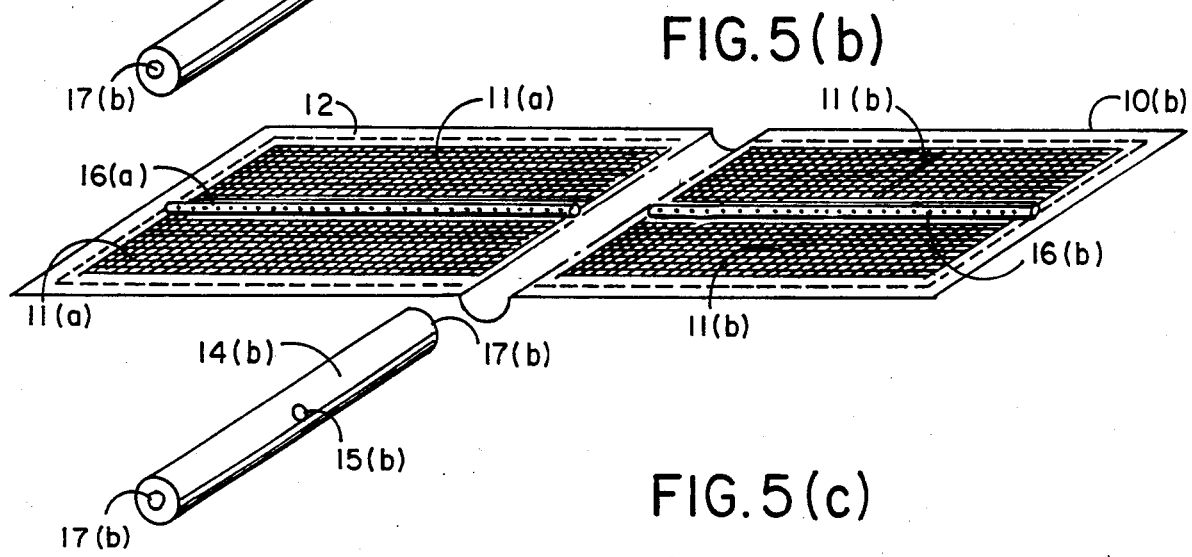
Figure 5C:
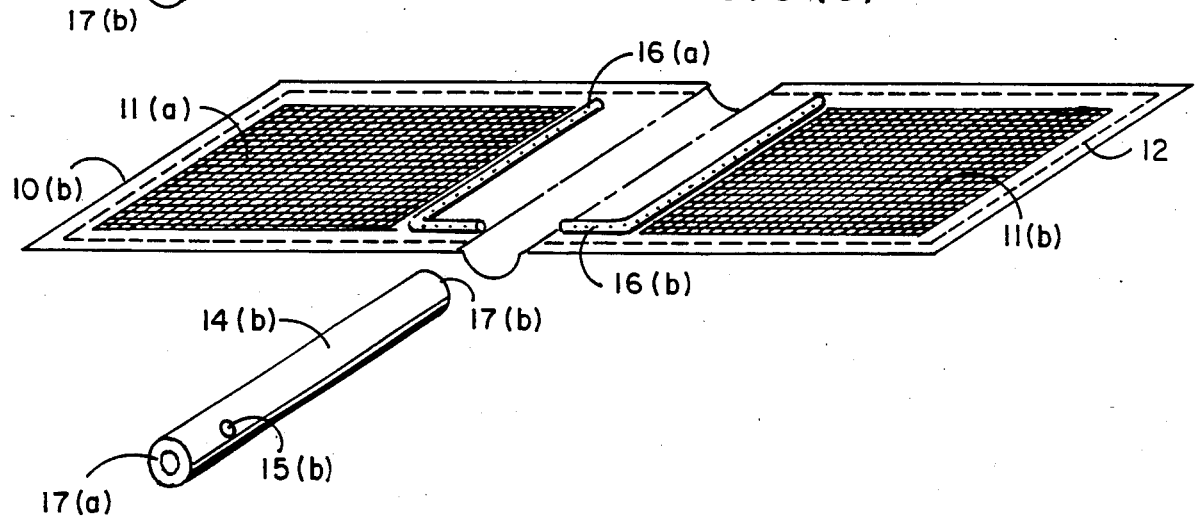

Referring to FIG. 5 there are illustrated schematically additional preferred spiral wound modules according to the present invention. In part (a) perforated permeate collection tubes 16(a) and 16(b) are indicated, each lying along one edge of permeate spacers 11(a) and 11(b) respectively. collection means 16(a) and 16(b) enter permeate conduit 14(b) through apertures 15(a) (not shown) and 15(b). If the membranes are adequately sealed to permeate conduit 14(b) then collection means 16(a) and 16(b) need not be sealed into apertures 15(a) and 15(b). On the other hand if each leaf is sealed along all four edges and to the respective collection means 16 where the latter exits the sandwich then the collection means 16 should be force fitted or otherwise sealed into the respective apertures 15 to inhibit mixing of permeate and retentate. In the configuration of part (a) of FIG. 5, end 17(a) of permeate conduit 14(b) will be plugged or otherwise sealed e.g. by being forced against the end of a container in which it is mounted e.g. against a resilient embossment. Sorbent treated permeate will then issue from end 17(b).

Figure 3A:
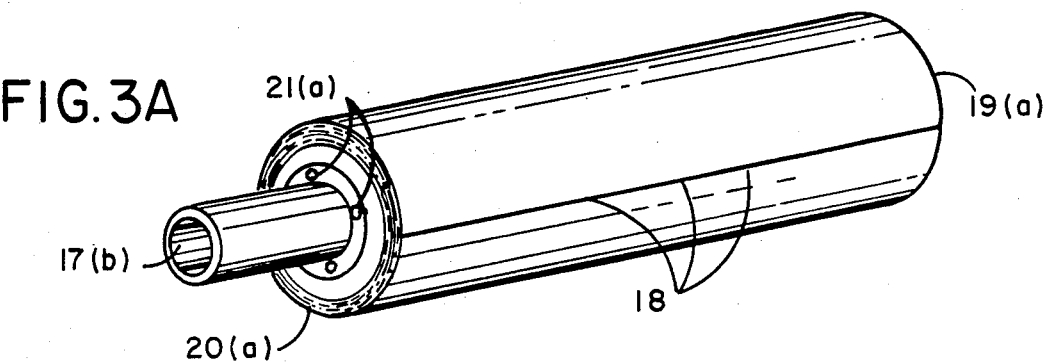
FIG. 3 is a schematic representation of two preferred spiral wound modules according to the present invention.
Figure 3B:
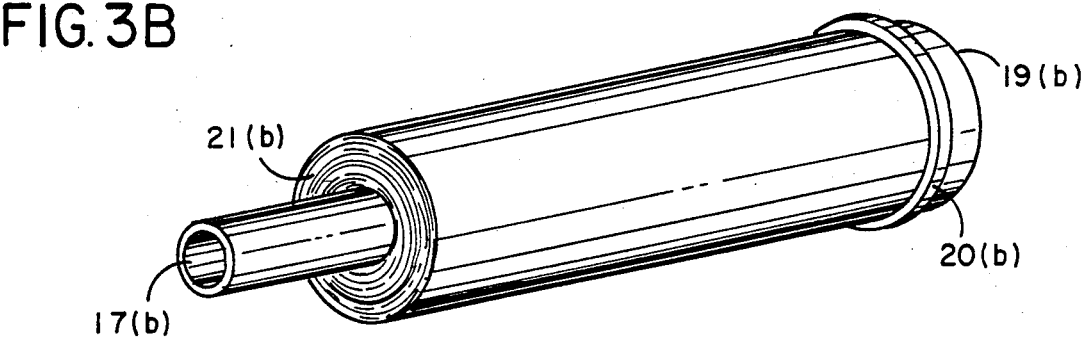

The configuration of part (a) of FIG. 5 is adapted for use in a spiral feed (distal edge) element according to FIG. 3(a). If the thickness of collection means 16(a) and 16(b) is substantially greater than the thickness of permeate spacers 11(a) and 11(b) then the feed spacers 13(a) and 13(b) (not shown, see FIG. 1(a)) are preferably cut out to accommodate the surplus thickness. It is also understood that the orientation of the permeate spacers 11(a) and 11(b) is preferably such as to permit easy flow of permeate to collection means 16(a) and 16(b). It will also be understood that collection means 16(a) and 16(b) need not extend the entire length of the respective envelopes but only for such length as to permit efficient collection of permeate. Further, although collection means 16(a) and 16(b) may be conveniently flexible, perforated tubes, it will be obvious to those skilled in the art that other essentially equivalent means may be used.

In part (b) of FIG. 5 there is illustrated another preferred embodiment of this invention. In this case permeate spacers 11(a) and 11(b) are divided into two (generally equal parts), the collection means 16(a) and 16(b) inserted between the parts and emptying into holes 15(a) (not shown) and 15(b) in permeate conduit 14(b). In this configuration, permeate enters sorbent in permeate conduit 14(b) essentially in the middle of the mass of sorbent and issues from both ends (17(a) and 17(b)) of permeate conduit 14(b). The configuration of part (b) of FIG. 5 is adapted for use in a spiral feed element according to FIG. 3(a).

In part (c) of FIG. 5 there is illustrated another preferred embodiment of the invention. In this case permeate collection means 16(a) and 16(b) lie along the edge of each envelope essentially parallel to permeate conduit 14(b) and empty into permeate conduit 14(b) through apertures 15(a) (not shown) and 15(b). The envelopes may be sealed along all four edges and to collection means 16(a) and 16(b) where the latter exit the envelopes. The configuration of part (c) of FIG. 5 is adapted for modules of either FIG. 3(a) or 3(b).

While the invention has been described with respect to certain exemplifications and embodiments thereof, the scope is not to be so limited except as in the claims appended hereto.

There is claimed:

1. An improved spiral-wound pressure membrane sorbent bed module comprising a central permeate conduit around which said spiral is wound, collection means for each membrane envelope in said module, said collection means communicating with the interior of said envelope along a substantial fraction of one edge of a permeate spacer in said envelope, all of said collection means conveying permeate to the interior of said central permeate conduit at substantially the same cross-section of said conduit, with the interior of said conduit containing sorbing means.

2. Apparatus according to claim 1 wherein said collection means comprises at least one channel in the wall of said permeate conduit.

3. Apparatus according to claim 1 wherein said collection means are adapted to carry permeate to a region in said sorbing means near one end of said sorbing means.

4. Apparatus according to claim 1 wherein said collection means are adapted to carry permeate to a region in said sorbing means near one end of said sorbing means and wherein said permeate conduit is adapted to permit permeate to exit said permeate conduit substantially only from a region in said sorbing means near the other end of said sorbing means.

5. Apparatus according to claim 1 further comprising a container for said module, with said collection means adapted to carry permeate to a region in said sorbing means near one end of said sorbing means, and with said permeate conduit and said container adapted to permit permeate to exit said permeate conduit substantially only from a region in said sorbing means near the other end of said sorbing means.

6. Apparatus according to claim 1 adapted to permit feed fluid to enter said module substantially only along the distal edge of said spiral.

7. Apparatus according to claim 1 adapted to permit feed fluid to enter said module substantially only at one end of said spiral.

8. Apparatus according to claim 1 in which (a) said membrane comprises a polymer selected from the group consisting of: fully aromatic polyamides; arylalkyl polyamides; alkyl-aryl polyureas; cellulose esters; polyacrylonitrile; polybenzimidazolone; polypiperazincamides; sulfonated polyfuran; sulfonated polysulfone; polycarbonate; polyvinyl chloride; alkyl polyamides; polyvinylidne fluoride; copolymers of acrylonitrile and vinyl chloride; polyacetal; polyacrylates; polyelectrolyte coacervates; cross-linked polyvinyl alcohol; cellulose nitrate; acrylic copolymers; polytetrafluoroethylene; polyesters; polypropylene; silicone-polycarbonate copolymers; polyphenylene oxide; polyethylene coated polysulfone; and silicone rubber coated polysulfone; and (b) said sorbent is selected from the group consisting of: activated carbon; activated carbon containing an oligo-dynamic metal; particulate ion-exchangers; micro-organism sorbing porous quaternary ammonium anion exchange particles; activated silica; activated alumina; molecular sieves; and mixtures thereof.

9. Apparatus according to claim 1 wherein said membrane comprises cellulose acetate and said sorbent comprises silvered activated carbon.

10. Apparatus according to claim 1 wherein said sorbent is contained in a removable element such as a sac or cylinder.

* * * * *